INVENTOR.
JOSEPH W. GRATIAN
BY George J. Seligsohn
ATTORNEY

Nov. 28, 1961 J. W. GRATIAN 3,011,160

ERROR DETECTION AND COMPENSATION FOR QUANTIZED SIGNAL RECORDING SYSTEM

Filed March 23, 1960 2 Sheets-Sheet 2

United States Patent Office 3,011,160
Patented Nov. 28, 1961

3,011,160

ERROR DETECTION AND COMPENSATION FOR QUANTIZED SIGNAL RECORDING SYSTEM

Joseph W. Gratian, Rochester, N.Y., assignor to General Dynamics Corporation, Rochester, N.Y., a corporation of Delaware Filed Mar. 23, 1960, Ser. No. 17,164
7 Claims. (Cl. 340—174.1)

This invention relates to magnetic recording systems and, more particularly to such a system having error detection and compensation for recording a quantized signal on a magnetic medium.

It is often desired to record data, either in digital or analog form, on a magnetic medium, such as a tape, drum, etc. Normally, digital data to be recorded is presented in binary notation as mark and space signals. This has the advantage that mark signals may be recorded by saturating the mgnetic medium in a given direction and space signals may be recorded either as an absence of recording signal or by saturating the magnetic medium in the opposite direction. Therefor, the exact level of a recording signal is unimportant, so long as it is sufficient to saturate the magnetic medium.

A disadvantage of presenting digital data to be recorded in binary notation is that it takes a relatively large number of individual bits to designate a fairly high number. For instance, to designate a quantity which may have any value between zero and 999, ten individual bits of binary notation are needed. Since each of these bits must be individually recorded on the magnetic medium, the data density on the magnetic medium will be relatively low.

It will be seen that if digital data is presented in decimal notation, i.e., the recording signal has any one of ten discrete given levels in accordance with the digit to be recorded, the data density on the magnetic medium may be substantially increased. For instance, it takes only three bits of data in decimal form to designate any number between zero and 999, rather than the ten bits needed when binary notation is used. Therefore, by utilizing decimal notation, more than three times as much data may be recorded on a given amount of magnetic medium as would be needed if binary notation were utilized.

Often the data to be recorded is in analog form. If this analog data is continuously recorded, a relatively large amount of magnetic medium is needed. In many cases, however, the rate of change of the analog data is relatively slow. It will be seen that in these cases the data density on the magnetic medium may be increased, and the amount of magnetic medium needed thereby reduced, by sampling the analog data at periodic intervals which are short compared to the rate of change of the analog data, and recording the then-existing level of the analog data at the instant of each sampling. In this case, the magnetic medium, rather than moving continuously, may be moved intermittently each sampling period.

It will be further seen that regardless of whether a digital data signal having decimal notation or a sampled analog signal is to be recorded, information contained in the data signal is determined solely by the level thereof. This creates a severe problem in implementing the recording of such a data signal.

The residual magnetization of an unrecorded magnetic medium is not perfectly uniform, but varies in a random manner from point to point. Therefore, the resulting magnetization of the recording medium in response to a recording signal of a given level will be affected by the residual magnetization which existed at the point on the magnetic medium where the recording took place. Thus, if two poitns on the magnetic medium have a recording signal of the same level applied thereto, during playback of the magnetic medium the respective signals derived from these two points on the medium will differ in level due to the different residual magnetizations at these points on the magnetic medium at the time that the recording signal was applied thereto. This results in an intolerable error being introduced.

It is, therefore, an object of this invention to provide an improved magnetic recording system.

It is a further object of this invention to provide a magnetic recording system for recording a signal having quantized signal levels.

It is a still further object of this invention to provide a magnetic recording system for recording a signal having quantized signal levels in which error due to residual magnetization of the recording medium is detected and compensated for at the time the recording is made.

These and other objects, features and advantages of the present invention will become more apparent from the following detailed description taken together with the accompanying drawings, in which.

Figure 1:
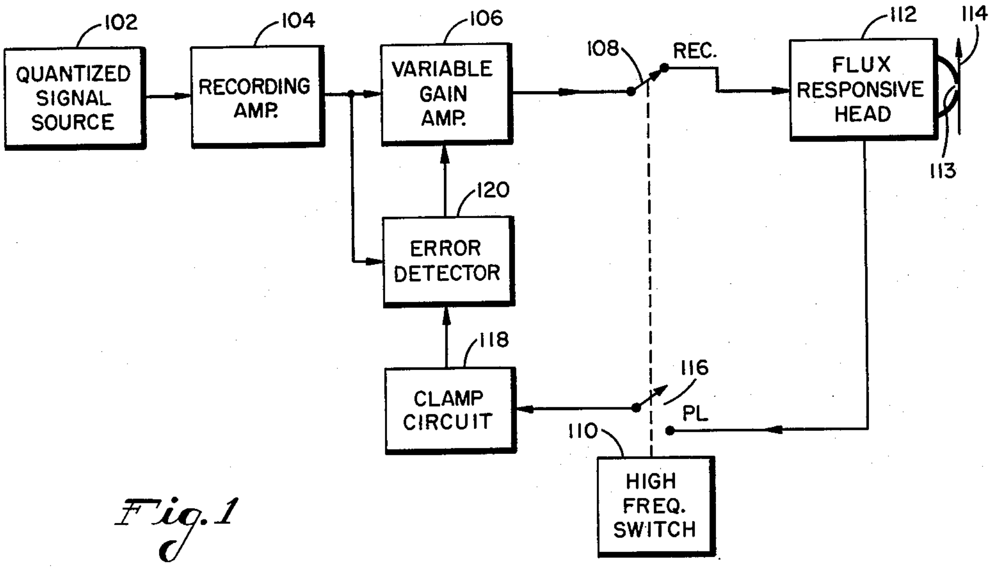
FIG. 1 is a functional block diagram of the invention.

Referring now to Fig 1, the output signal from quantized signal source 102 is applied as an input to recording amplifier 104. The output from recording amplifier 104 is applied as a first input to variable gain amplifier 106. The output from variable gain amplifier 106 is applied through recording contacts 108 of high frequency switch 110 as a recording input to flux-responsive head 112, which includes gap 113 in cooperative relationship with moving magnetic medium 114. The output of the played back output of flux-responsive head 112 is applied through playback contacts 116 of high frequency switch 110 to the input of clamp circuit 118. The output of clamp circuit 118 is applied as a first input to error detector 120 and the output from recording amplifier 104 is applied as a second input to error detector 120. The output from error detector 120 is applied as a second input to variable gain amplifier 106 to control the gain thereof in accordance therewith.

Figure 2:
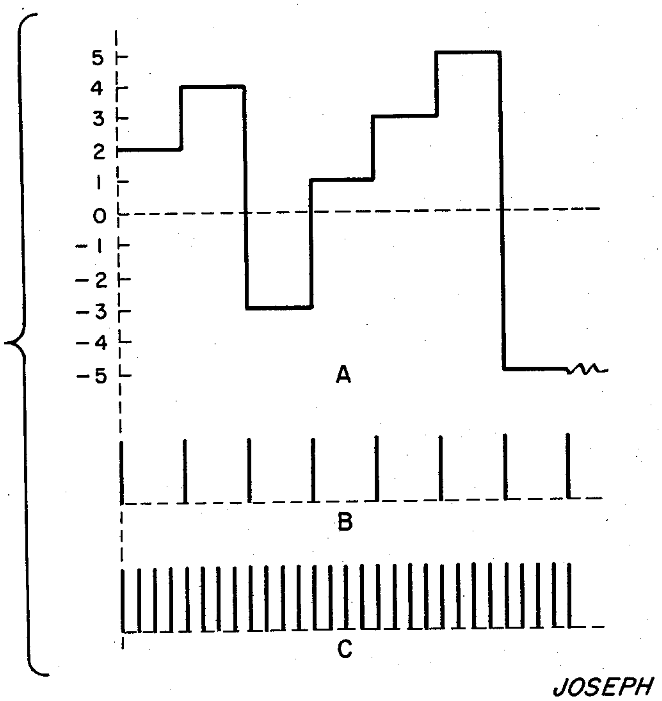
FIG. 2 shows a plurality of time relation curves of signals present in the recording system of the present invention.

Referring now to graph A of FIG. 2, there is shown the quantized signal emerging from quantized signal source 102. As shown in grap A of FIG. 2, this quantized signal has some constant level for a predetermined period, followed by another constant level for the next predetermined period. If the quantized signal is a digital data signal in decimal notation, during any predetermined period, it will have one of ten discrete levels, which, as shown, include five positive levels and five negative levels.

If the quantized signal from quantized signal source 102 is a sampled analog signal, the sampling takes place each predetermined period and the level of the quantized signal during any predetermined period may have any value between −5 and 5, in accordance with the magnitude of the analog data signal at the instant of sampling.

Referring now to the operation of the device shown in FIG. 1, the quantized signal from quantized signal source 102 is merely amplified by recording amplifier 104. If the quantized signals from quantized signal source 102 has sufficient magnitude and power, recording amplifier 104 may be omitted altogether.

After emerging from recording amplifier 104, the quantized signal to be recorded is passed through variable gain amplifier 106, which may have a gain less than unity, and is applied intermittently by contacts 108 as the recording input to flux-responsive head 112.

High frequency switch 110, which operates at a frequency which is high relative to the predetermined period of the quantized signal, causes recording contacts 108 and playback contacts 116 to be alternately closed, so that when recording contacts 108 are closed, playback contacts 116 are open and when playback contacts 116 are closed, recording contacts 108 are open.

Flux-responsive head 112 is a record-reproduce head which produces a recording flux across gap 113 thereof which is proportional to the level of the recording signal applied as an input thereto. This results in the portion of magnetic medium 114 in cooperative relationship with gap 113 being magnetized by the flux across gap 113.

Magnetic medium 114 may move continuously at a rate which is sufficiently slow such that the time it takes for a point thereof to move the length of gap 113 is approximately equal to a predetermined period of the quantizing signal. Alternately, magnetic medium 114 may be moved intermittently a distance at least equal to the length of gap 113 at the beginning of each predetermined period of the quantizing signal. In either case, a point on magnetic medium 114 remains in cooperative relationship with gap 113 for a predetermined period of the quantized signal.

Flux-responsive head 112 is a head which derives an output signal which is proportional to the flux across gap 113, rather than proportional to the rate of change of the flux across gap 113. An example of such a flux-responsive head is a head utilizing a Hall cell for reproduction, such as described in copending patent application Serial No. 764,974, filed October 2, 1958, by Joseph W. Gratian, entitled "Semi-Conductor Magnetic Pickup," and assigned to the same assignee as the present invention.

It will be seen that during those intervals during which playback contacts 116 are closed and recording contacts 108 are open, the flux across gap 113 will be proportional to the magnetomotive force of the magnetization of that portion of magnetic medium 114 which is then in cooperative relationship with gap 113. Further, since recording contacts 108 and playback contacts 116 are alternately closed, the magnetomotive force of the portion of magnetic tape 114, then in cooperative relationship with gap 113 when recording contacts 108 are open and playback contacts 116 are closed, will be determined by the level of the applied recording signal modified by the residual pre-existing magnetization of the portion of magnetic medium 114 in cooperative relationship with gap 113.

When playback contacts 116 are closed, the output signal from flux-responsive head 112, which is proportional to the then-existing magnetization of that portion of the tape then in cooperative relationship with gap 113, will be applied to the input of clamp circuit 118. Clamp circuit 118, which may include a short time constant integrating circuit, is a circuit which produces an output which assumes and holds the potential of a momentarily applied signal.

Therefore, when in response to the operation of high frequency switch 110, recording contacts 108 have been closed for the second time, the output from clamp circuit 118 will be equal to the input to clamp circuit 118 previously applied thereto when playback contacts 116 were closed. The level of this input, it will be seen, depends on the level of the recording signal applied to flux-responsive head 112 the first time recording contacts 108 were closed. Since the quantized signal maintains a constant level throughout several openings and closings of recording contacts 108 and playback contacts 116, if there was no effect from the residual magnetization of magnetic medium 114, the played back level appearing at the output of clamp circuit 118 would be equal to the quantized signal level emerging from recording amplifier 104. However, since the residual magnetization of magnetic medium 114 is a factor, this ordinarily will not be the case and an error will exist.

Error detector 120 compares the levels of the quantized signal emerging from recording amplifier 104 and the output of clamp circuit 118, and produces an output signal which is proportional to the difference between these levels.

The output of error detector 120 is applied as a second input to variable gain amplifier 106 to control the gain thereof. Therefore, the level of the recorded signal emerging from the output of variable gain amplifier 106 is modified in accordance with the error to compensate for this error. Thus, if it is found that the output from clamp circuit 118 has a higher level than the level of the quantized signal emerging from recording amplifier 104, the gain of variable gain amplifier 106 will be lowered and a lower level signal will be recorded. Therefore, when playback contacts 116 again close and recording contacts 108 open, the output from flux-responsive head applied to clamp circuit 118 will be lowered and the error will be reduced.

Since high frequency switch 110 operates many times during one predetermined period of the quantizing signal, error detector 120 and variable gain amplifier 106 will be able, before the end of the predetermined period of the quantizing signal, to modify the level of the recording signal to a point such that the level of the played back signal exactly equals the level of the quantized signal emerging from recording amplifier 104.

Thus, it will be seen that in effect the actual level of magnetization of the magnetic medium is continuously being monitored and compared with what it should be and any error therein is corrected while recording is taking place.

Figure 3:
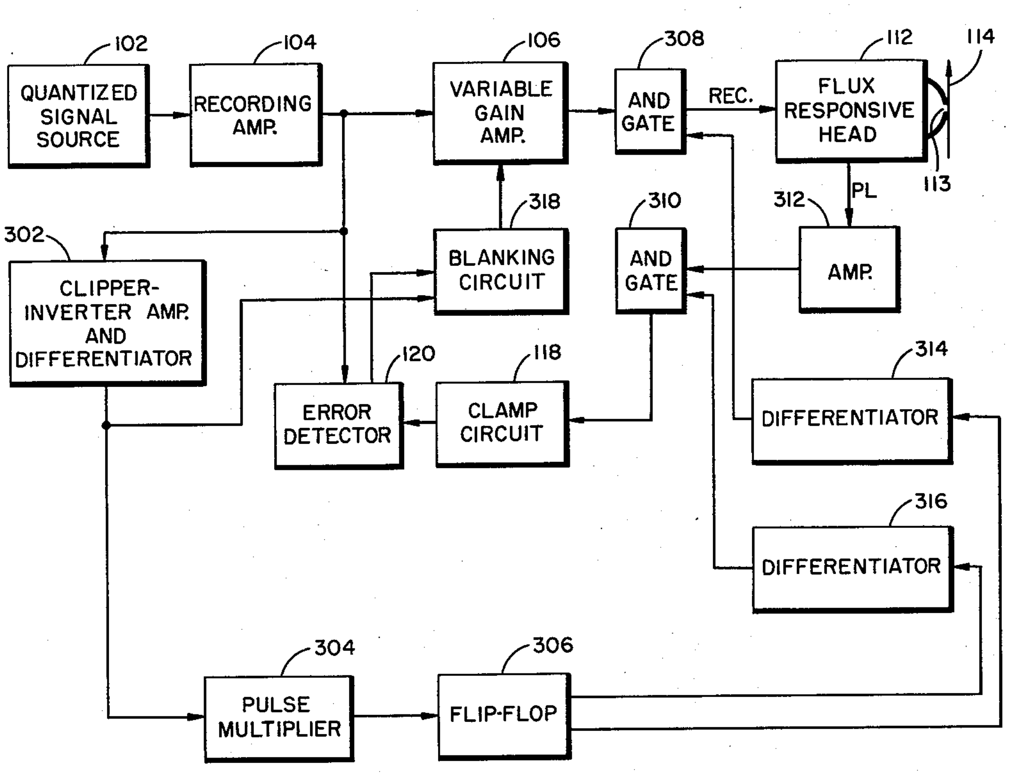
FIG. 3 is a block diagram of a preferred embodiment of the invention.

Referring now to FIG. 3, which shows a preferred embodiment of the invention, quantized signal source 102, recording amplifier 104, variable gain amplifier 106, flux-responsive head 112, gap 113, magnetic medium 114, clamp circuit 118, and error detector 120 in FIG. 3 are identical in structure and function to the corresponding elements, discussed above, in FIG. 1.

In FIG. 3, high frequency switch 110 and its associated contacts 108 and 116 of FIG. 1 are replaced by electronic switching and synchronizing means. More particularly, the quantized signal emerging from recording amplifier 104 is applied as an input to clipper-inverter amplifier and differentiator 302. Clipper-inverter amplifier and differentiator 302 produces a positive synchronizing pulse of given amplitude in response to a change in level of the quantized signal. As shown in graph B of FIG. 2, synchronizing pulses are generated by clipper-inverter amplifier and differentiator 302 at the beginning of each successive predetermined period of the quantized signal.

As shown, the synchronizing pulses, appearing as an output from clipper-inverter amplifier and differentiator 302 are applied as an input to pulse multiplier 304. Pulse multiplier 304 may be a free-running multivibrator operating at a frequency approximately equal to a given harmonic of the predetermined period of the quantizing signal, which is brought into exact synchronism with this given harmonic by the synchronizing pulses applied as an input thereto. As shown in graph C of FIG. 2, pulse multiplier 304 produces a plurality of equally spaced output pulses during each interval between successive synchronizing pulses. Curve C of FIG. 2 shows four output pulses from pulse multiplier 304 in the interval occurring between successive synchronizing pulses of curve B of FIG. 2. However, this is only illustrative. Pulse multiplier 304 may produce five, ten, or even more equally spaced output pulses during each successive interval between synchronizing pulses.

The output pulses from pulse multiplier 304 are applied as an input to flip-flop 306. Flip-flop 306 is switched back and forth between a first stable condition thereof and a second stable condition thereof in response to each pulse from pulse multiplier 304 applied thereto.

In FIG. 3, AND gate 308, which replaces recording contacts 108 of FIG. 1, is inserted between the output of variable gain amplifier 106 and the recording input of flux-responsive head 112. AND gate 310, which replaces playback contacts 116 of FIG. 1, is inserted between the playback output of flux-responsive head 112 and the input to clamp circuit 118. If necessary, the playback output of flux-responsive head 112 may be amplified by amplifier 312 before being applied to AND gate 310.

As shown, flip-flop 306 has a first output which is coupled to an input of AND gate 308 through differentiator 314 and a second output which is coupled to an input of AND gate 310 through differentiator 316.

In FIG. 3, the output of error detector 120 is not applied directly as the second input to variable gain amplifier 106, as in FIG. 1, but is applied to the second input of variable gain amplifier 106 through blanking circuit 318. Synchronizing pulses appearing as the output of clipper-inverter amplifier differentiator 302, in addition to being applied to pulse multiplier 304, are also applied as an input to blanking circuit 318.

Considering now the operation of the device shown in FIG. 3, as mentioned above, in response to an output pulse from pulse multiplier 304 being applied as an input to flip-flop 306, flip-flop 306 will switch from a first bistable condition to a second bistable condition, and in response to the next output pulse from pulse multiplier 304 being applied as an input to flip-flop 306, flip-flop 306 will switch back from its second bistable condition to its first bistable condition.

Differentiator 314 produces an output pulse of a given polarity in response to flip-flop 306 being switched from its first bistable condition to its second bistable condition and differentiator 316 produces an output pulse of this same given polarity in response to flip-flop 306 being switched back from its second bistable condition to its first bistable condition. Thus, output pulses of this given polarity are alternately produced by differentiators 314 and 316, respectively.

Both AND gates 308 and 310 are normally nonconductive, but AND gate 308 is rendered conductive in response to the output pulse from differentiator 314 being applied thereto and AND gate 310 is rendered conductive in response to the output pulse from differentiator 316 being applied thereto.

Thus, it will be seen AND gates 308 and 310 are operated alternately to alternately pass the recording signal from variable gain amplifier 106 to the recording input flux-responsive head 112 and then pass the playback output from flux-responsive head 112 to the input of clamp circuit 118.

Blanking circuit 318 is normally effective in applying the output from error detector 120 as the gain control signal to variable gain amplifier 106. However, in response to a synchronizing pulse from clipper-inverter amplifier and differentiator 302 being applied to blanking circuit 318, blanking circuit 318 applies a signal to variable gain amplifier 106 which is effective in cutting off variable gain amplifier 106. This insures that no recording signal is applied to flux-responsive head 112 at the termination of one predetermined period and the commencement of the next predetermined period of the quantizing signal, when the level of the quantizing signal is in a state of change.

In all other respects, FIG. 3 operates in an identical manner to that of FIG. 1, the operation of which has been described above.

Figure 4:
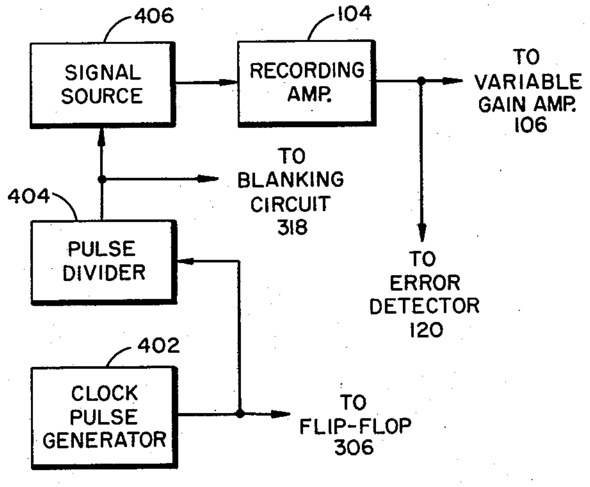
FIG. 4 is a fragmentary block diagram of a modification of the preferred embodiment of the invention shown in FIG. 3.

Referring now to FIG. 4, which shows a modification of the preferred embodiment of FIG. 3, in which the high frequency pulses to flip-flop 306 are produced by clock pulse generator 402. The high frequency pulses from clock pulse generator 402, as shown in FIG. 4, are also applied to pulse divider 404, which generates a synchronizing pulse in response to a certain given number of high frequency pulses from clock pulse generator 402 being applied thereto. The synchronizing pulses, which appear at the output of pulse divider 404, are applied as an input to signal source 406, where they are effective in controlling the quantizing of the output signal from signal source 406, which is applied as an input to recording amplifier 104; that is, the predetermined period of the quantized signal applied to recording amplifier 104 is controlled by the synchronizing pulses from pulse divider 404 and is made equal to the time interval between successive synchronizing pulses.

The synchronizing pulses from pulse divider 404 are also applied to blanking circuit 318, as shown.

Thus, it will be seen that FIG. 4 differs from FIG. 3 only in that in FIG. 3, the predetermined period of the quantized signal is the independent variable from which the high frequency pulses are derived, while in FIG. 4, the high frequency pulses are the independent variable from which the predetermined period is derived. In both cases, however, synchronism is maintained therebetween. In all other respects, the modification of FIG. 4 is identical to FIG. 3 in both structure and function.

Although only preferred embodiments of this invention have been described in detail herein, it is not intended that the invention be restricted thereto, but that it be limited only by the true spirit and scope of the appended claims.

What is claimed is:

1. A device for recording on a moving magnetic medium a recording signal which has a constant level for at least a predetermined period of time, said device comprising a flux-responsive head in cooperative relationship with said magnetic medium, said head having an input for applying to said head a signal to be recorded on said medium and an output for deriving a signal played back from said medium, a high frequency switch having a first position and a second position, said switch switching alternately between its first and second positions at a rate which is high relative to both the rate of movement of said magnetic medium and said predetermined period, a variable gain amplifier having first and second inputs and an output, means for applying said recording signal to said first input of said variable gain amplifier, first means controlled by said switch for applying said output of said variable gain amplifier to the input of said head only when said switch is in its first position, a clamp circuit for assuming and holding the potential of a signal momentarily applied as an input thereto, second means controlled by said switch for applying said output of said head as an input to said clamping circuit only when said switch is in its second position, an error detector for producing an output proportional to the difference between first and second inputs applied thereto, means for applying the output of said clamping circuit as said first input to said error detector, means for applying said recording signal as said second input to said error detector, and means for applying the output of said error detector to said second input of said variable gain amplifier to control the gain thereof in accordance therewith.

2. The device defined in claim 1, wherein said high frequency switch includes a flip-flop having first and second stable conditions, means for applying pulses at a relatively high frequency to said flip-flop to cause said flip-flop in response to successive pulses applied thereto to switch alternately between its first and second stable conditions, a first differentiator coupled to said flip-flop for producing a first output pulse therefrom in response to said flip-flop switching from its first to its second stable condition, and a second differentiator coupled to said flip-flop for producing a second output pulse therefrom in response to said flip-flop switching from its second to its first stable condition, wherein said first means controlled by said switch includes a first AND gate, means for applying said output of said variable gain amplifier as a first input to said first AND gate, means for applying said first output pulse as a second input to said first AND gate, and means for applying the output of said first AND gate to said input of said head, and wherein said second means controlled by said switch includes a second AND gate, means for applying said output of said head as a first input to said second AND gate, means for applying said second output pulse as a second input to said second AND gate, and means for applying the output of said second AND gate as said input to said clamp circuit.

3. The device defined in claim 2, wherein during each successive predetermined period said recording signal has some selected level, and further comprising synchronizing means for providing synchronism between the frequency of said pulses applied to said flip-flop and said predetermined periods.

4. The device defined in claim 3, wherein said synchronizing means includes clipper-inverter amplifier and differentiator means having said recording signal applied as an input thereto for producing a synchronizing pulse in response to a change in level of said recording signal, and a pulse multiplier having said synchronizing pulse applied as an input thereto for generating said high-frequency pulses applied to said flip-flop.

5. The device defined in claim 4, wherein said means for applying the output of said error detector to said second input of said variable gain amplifier includes a blanking circuit having said synchronizing pulse applied thereto for cutting off said variable gain amplifier in response to a synchronizing pulse.

6. The device defined in claim 3, further including a signal source providing said recording signal, and wherein said synchronizing means includes a clock pulse generator producing said high frequency pulses applied to said flip-flop, a pulse divider having said high frequency pulses applied as an input thereto for producing a synchronizing pulse in response to the application of a given number of high frequency pulses, and means for applying said synchronizing pulses to said signal source for controlling the selection of a given level of said recording signal.

7. In a device comprising a single flux-responsive head for alternately recording and monitoring on a magnetic medium a recording signal which has a constant level for at least a predetermined period of time, the combination therewith of first means including switching means operating at a frequency relative to said predetermined period, the rate of said switching being sufficiently high to repetitively in sequence apply said recording signal to said head and then monitor the level of the signal that actually has been recorded during the elapse of said predetermined period, and second means coupled to said first means for comparing said monitored level with said constant level and in accordance with the difference therebetween varying the level of the recording signal applied to said head to minimize said difference.

No references cited.